United States Patent
Sjöberg et al.

[11] Patent Number: 6,165,325
[45] Date of Patent: *Dec. 26, 2000

[54] VACUUM VESSEL FOR CONTINUOUS OR SEMICONTINUOUS TREATMENT OF FATTY OILS

[75] Inventors: Peter Sjöberg, Solna; Anders M.A. Hillström, Tullinge, both of Sweden

[73] Assignee: Alfa Laval AB, Lund, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/737,998

[22] PCT Filed: Jun. 6, 1995

[86] PCT No.: PCT/SE95/00655

§ 371 Date: Jun. 17, 1997

§ 102(e) Date: Jun. 17, 1997

[87] PCT Pub. No.: WO95/33809

PCT Pub. Date: Dec. 14, 1995

[30] Foreign Application Priority Data

Jun. 8, 1994 [SE] Sweden .................................. 9401979

[51] Int. Cl.[7] .............................. B01D 3/10; C07C 51/44
[52] U.S. Cl. .............................. 202/158; 96/199; 55/443; 196/111; 202/205; 554/205
[58] Field of Search .............................. 203/92, 100, 72, 203/49; 202/197, 205, 234, 158, 153; 96/199, 193, 194, 197, 198; 55/442–445; 554/205; 134/105; 159/16.1; 196/111, 114, 115, 127

[56] References Cited

U.S. PATENT DOCUMENTS

| | | |
|---|---|---|
| 1,969,793 | 8/1934 | Hechenbleikner ...................... 202/197 |
| 2,489,509 | 11/1949 | Straight ...................... 202/153 |
| 2,621,196 | 12/1952 | Thurman ...................... 203/40 |
| 2,691,665 | 10/1954 | Bailey ...................... 203/92 |
| 3,061,622 | 10/1962 | Fiala ...................... 554/189 |
| 3,584,438 | 6/1971 | Skoli et al. ...................... 55/193 |
| 3,607,670 | 9/1971 | King ...................... 203/100 |
| 3,622,127 | 11/1971 | Burke, Jr. ...................... 366/148 |
| 4,426,361 | 1/1984 | Bushnell ...................... 196/14.52 |
| 4,488,934 | 12/1984 | Silvis ...................... 202/158 |
| 4,872,949 | 10/1989 | Wilwerding ...................... 202/202 |
| 4,929,310 | 5/1990 | Saft ...................... 202/158 |

FOREIGN PATENT DOCUMENTS 62-207398  9/1987  Japan .

*Primary Examiner*—Virginia Manoharan
*Attorney, Agent, or Firm*—Fish & Richardson P.C.

[57] ABSTRACT

A vacuum vessel for continuous or semicontinuous treatment of fatty oils in connection with deodorization includes spaces through which the oil which is to be treated is brought to pass. The vessel also contains U-tubes used to heat or cool the oil and perforated pipes arranged at the bottom of the vessel. Through these pipes stripping gas is led into the oil. The vacuum vessel is connected to a vacuum source. According to the invention the vessel has the form of a container with a mainly rectangular bottom with partitions parallel to a long side of the container. These partitions delimit channels connected in series through which the oil passes. The bottom of a first channel as seen in the direction of flow is arranged on a higher level than the second channel seen in the direction of flow such that the oil is forced to pass through the vessel by gravity. The vacuum vessel has a low height in relation to the length of its sides.

10 Claims, 3 Drawing Sheets

VACUUM VESSEL FOR CONTINUOUS OR SEMICONTINUOUS TREATMENT OF FATTY OILS

FIELD OF THE INVENTION

The present invention relates to a vacuum vessel for continuous or semicontinuous treatment of fatty oils in connection with deodorization. The vacuum vessel comprises spaces through which the oil which is to be treated is brought to pass and means to heat or cool said oil. At the bottom of the vessel there are perforated pipes arranged to lead stripping gas into the oil. The vessel is also connected to a vacuum source.

BACKGROUND OF THE INVENTION

When producing consumer products out of different vegetable or animal oil deodorization is a part of the refining process. During the deodorization the oil is heated to a high temperature 180–275° C. in order to remove contaminants and unwanted substances from the oil. These substances have a lower boiling point than the different triglycerides which constitute the fatty oil. The deodorization is carried through under vacuum 1–20 mbar and the removal is facilitated by adding stripping gas to the oil. The stripping gas may consist of an inert gas or steam. The stripping gas makes the mixing of the oil and the removal of the unwanted substances easier.

For many types of oils it is useful to heat the oil under vacuum with addition of stripping gas during a pretreatment step prior to the deodorization to remove the dissolved air and at that hinder oxidation of the oil.

The deodorized oil is also in many cases subjected to a further treatment with injection of stripping gas under vacuum during a simultaneous cooling.

The vacuum vessels which are used for preheating or cooling the oil which is to be deodorized have previously usually consisted of cylindrical pressure vessels with inserts provided with baffles. The baffles have been arranged such that the oil flows in a plug flow. In the vessels there are tubes for the heating/cooling medium and pipes for distribution of stripping gas. The cylindrical vessels have usually had double curved side walls which were welded to the cylindrical surface. The shape described above makes the application of the necessary couplings and connections for oil, heating/cooling medium, stripping gas and vacuum very costly and complicated. The cleaning of the vacuum vessels is also made more difficult.

SUMMARY OF THE INVENTION

According to the invention it is now proposed that the vacuum vessel is designed in quite another way, which both secures a good treatment of the oil, gives a cheaper production cost for the vessel and facilitates the cleaning. The vacuum vessel according to the invention is mainly characterized in that the vessel has the form of a container with a principally rectangular bottom with partitions which are parallel with a long side of the container. These partitions delimit channels connected in series through which the oil passes. The bottom of the first channel as seen in the direction of flow is arranged on a higher level than the second channel as seen in the flow direction in such a way that the oil is brought to pass through the vessel by means of gravity. The vessel has a low height in relation to the length of its sides.

With such a design of the vessel the oil is forced to flow a long distance which gives a good treatment at the same time as the height of the vessel is limited. The channels are confined by the bottom of the vessel. The height must only with such a distance exceed the height of the partitions that a necessary gas space is obtained.

The means which heat or cool the oil can advantageously comprise U-tubes through which flows a heating or cooling medium. Each channel comprises suitably one or several U-tubes. If the vessel shall be used as a regenerative the cooling medium can advantageously consisting of not yet treated oil which, when passing the vessel, is heated by the oil which is to be cooled. With such an arrangement the connections to the source for heating or cooling medium are located at one short side of the vessel.

Suitably the connections for the perforated pipes for stripping gas are arranged at the other short side of the vessel. The perforated pipes are suitably arranged below the said means for heating or cooling the oil in the channels.

In order to avoid the situation wherein oil splashes or spatters from one channel to another due to the stripping the upper edge of the partitions extends well above the surface of the oil.

The walls of the vacuum vessel are firmly connected to each other in order to hinder surrounding air from being sucked into the vessel. In order to facilitate the cleaning the pipes for stripping gas are suitably arranged to be unfastended from the vacuum vessel. Such an arrangement means both that the cleaning of the stripping pipes is facilitated and that it is possible to enter the channels with cleaning lances and clean both these and the outside of the U-tubes.

The partitions are advantageously welded to the bottom of the vessel. With such an arrangement leakage between the channels in the vessel is avoided. The welded partitions also give the vessel an increased stability against the mechanical stresses to which the vessel may be exposed.

The stability may also be increased in that one or several partitions are firmly connected to the upper side of the vessel. In such a case there are openings for passage of stripping gas in these partitions.

The mechanical stability may also be increased if the partitions are undulated. Partitions with such a design also increase the turbulence in the channels.

The vacuum vessel may be used as a regenerative heat exchanger if the medium which flows through the U-tubes consists of oil which later shall be heated to deodorization temperature.

BRIEF DESCRIPTION OF THE DRAWINGS

The present invention is described further with reference to the attached drawings, FIG. 1 of which shows a section through a vacuum vessel seen from above, FIG. 2 shows a vertical section through the same vacuum vessel while

DETAILED DESCRIPTION

Figure 1:
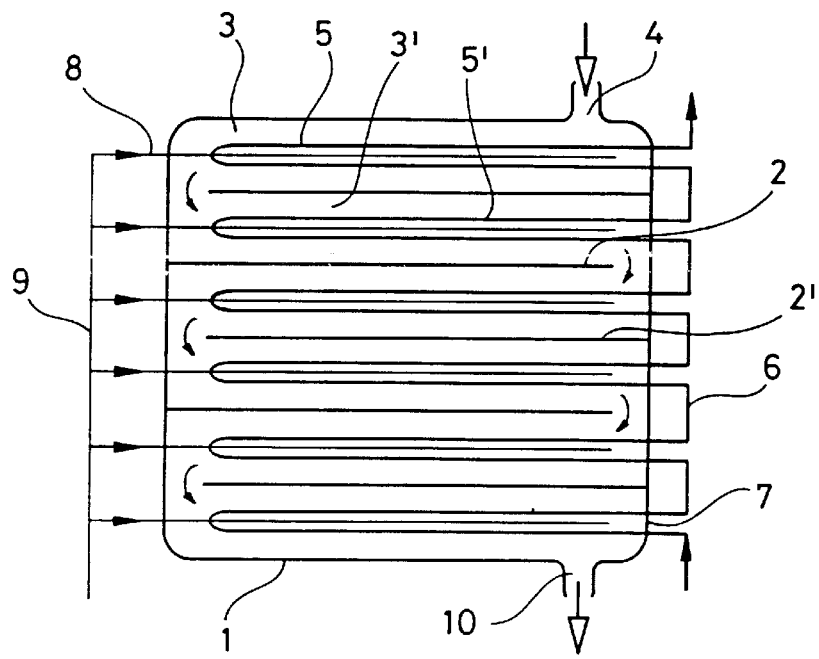

A general example of an embodiment of a vacuum vessel according to the invention is shown in FIG. 1. A vacuum vessel 1 has a bottom area with rectangular shape. In the vessel there is a number of partitions 2,2'. These partitions are arranged such that there are formed channels 3,3' in the vessel through which the oil that is to be treated in the vessel is brought to pass. The partitions are firmly connected to the short side of the vessel in one of its ends but terminate in the other a distance from the other short side. Every second partition is firmly connected to one short side of the vessel and every other second partition to the other short side. The longitudinal channels are consequently connected to each other at the short sides of the vessel. By this the oil which enters the first channel by way of an inlet 4 is forced to follow a serpentine-formed path through the vessel.

In each channel 3,3' there is at least one U-tube 5,5' through which a heating or cooling medium is brought to flow. The connections 6 for this medium to the heat/cool source are collected at one short side 7 of the vessel. In the bottom of each channel there is also a stripping pipe 8 through which stripping gas is injected into the oil. The stripping pipes 8 are connected to a conduit 9 connected to a source for stripping gas (not shown on the drawing). The treated oil leaves the vessel by way of an outlet 10.

Figure 2:
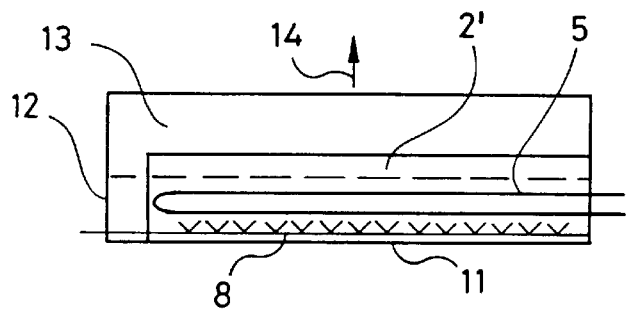

In FIG. 2 there is shown a schematical section through the vessel 1. In this it is seen that the stripping pipe 8 is arranged close to the bottom 11 of the vessel. Above this pipe there is a U-tube 5 for heating or cooling of the oil. On the drawing there is also shown a partition 2 which ends at a certain distance from the short side 12 of the vessel. The partition 2 extends up over the surface of the oil. In the upper part of the vessel there is a gas space 13 and in this a connection 14 to a vacuum source. The connection to the vacuum source may of course be arranged in different ways known previously.

Figure 3:
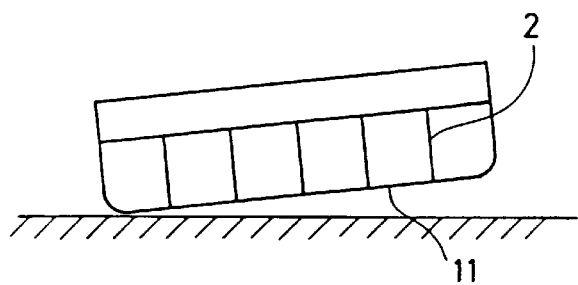
FIG. 3 shows a section at right angle to the section in FIG. 2.

As may be seen in FIG. 3 the vessel is suitably located in such a way that its bottom 11 forms a certain angle with the horizontal plane. This angle is 1–15°. The vessel is arranged such that the outlet is located at a lower level than the inlet. The bottom of the vessel is with advantage somewhat curved against the vertical side walls.

If so is desired the bottom of the vessel is instead shaped with steps in order to force the oil to flow from inlet to outlet.

Figure 4:
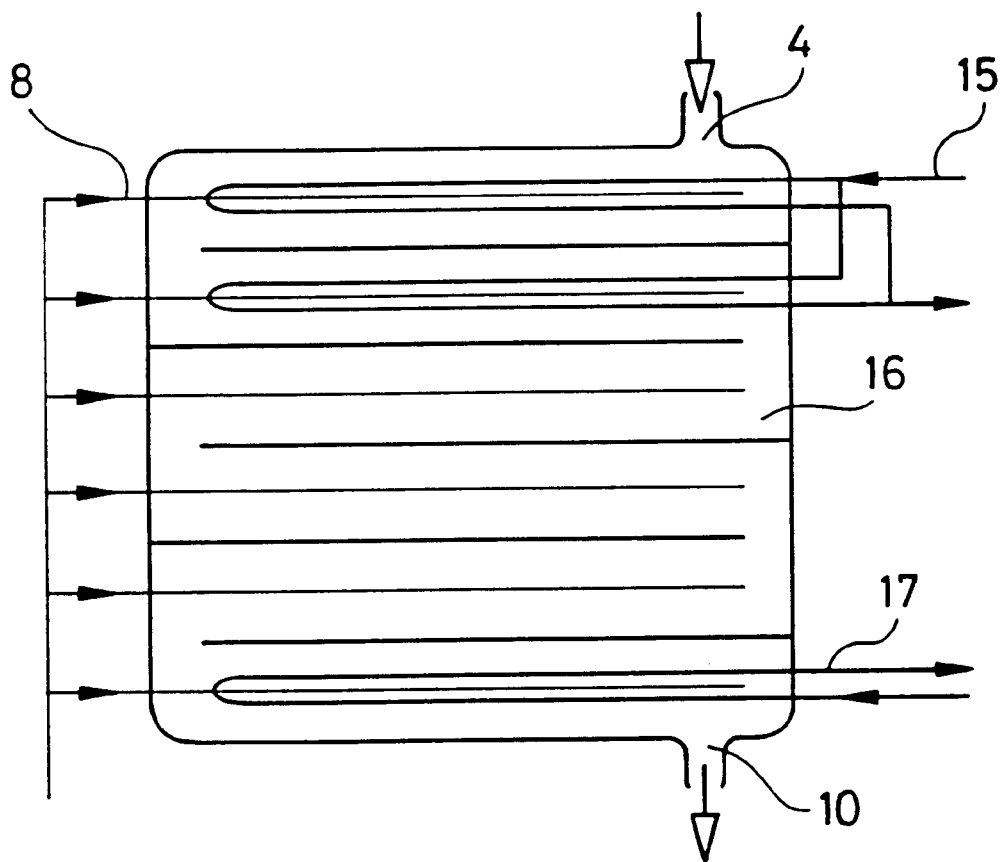
FIG. 4 there is shown a section through a minideodorizer.

In FIG. 4 there is shown a section through a vacuum vessel according to the invention which may function as a minideodorizer. Oil which is to be treated in the vacuum vessel is led into the vessel by way of an inlet 4. In the same way as is shown in the vessel in FIG. 1 there are partitions such that the oil follows a serpentine-like path through the vessel to the outlet 10. In the first channels the oil is heated to deodorizing temperature by steam 15 which is added through U-tubes. In the same way as shown in FIG. 1 there is in each channel a stripping pipe 8 for stripping gas. Connection to vacuum is arranged in the upper part of the vessel. When the oil has passed the first channels and reached the desired high temperature it flows through a space 16 in the vacuum vessel where the deodorization takes place. Here there is no further heating but stripping gas is added to the oil to drive away unwanted contaminants. When the oil has passed a desired number of channels and consequently been treated during a certain time it is cooled in a last channel with a cooling medium 17 in a U-tube. Suitably the cooling medium consists of untreated oil which after a preheating is led into the shown minideodorizer.

The embodiments shown on the drawing are as has been mentioned schematic and the dimension of the vessel is determined by the desired capacity of the deodorization plant.

In order to make the evaporation by way of stripping gas effective a large liquid area is needed in a vessel with as little volume as possible. A small plant may for example have the outer measurements 2.0×0.4×0.4 m while a larger plant may have the measurements 10×3×1.5 m. The long side of the vessel shall consequently be 2–10 m long while the height is 0.4–1.5 m. Also the distance between the partitions is determined by the capacity of the plant, i.e. the outer measurements of the vessel. The distance shall not be larger than that the flow through the channels will be turbulent, also without the influence of the stripping gas on the flow.

Figure 5:
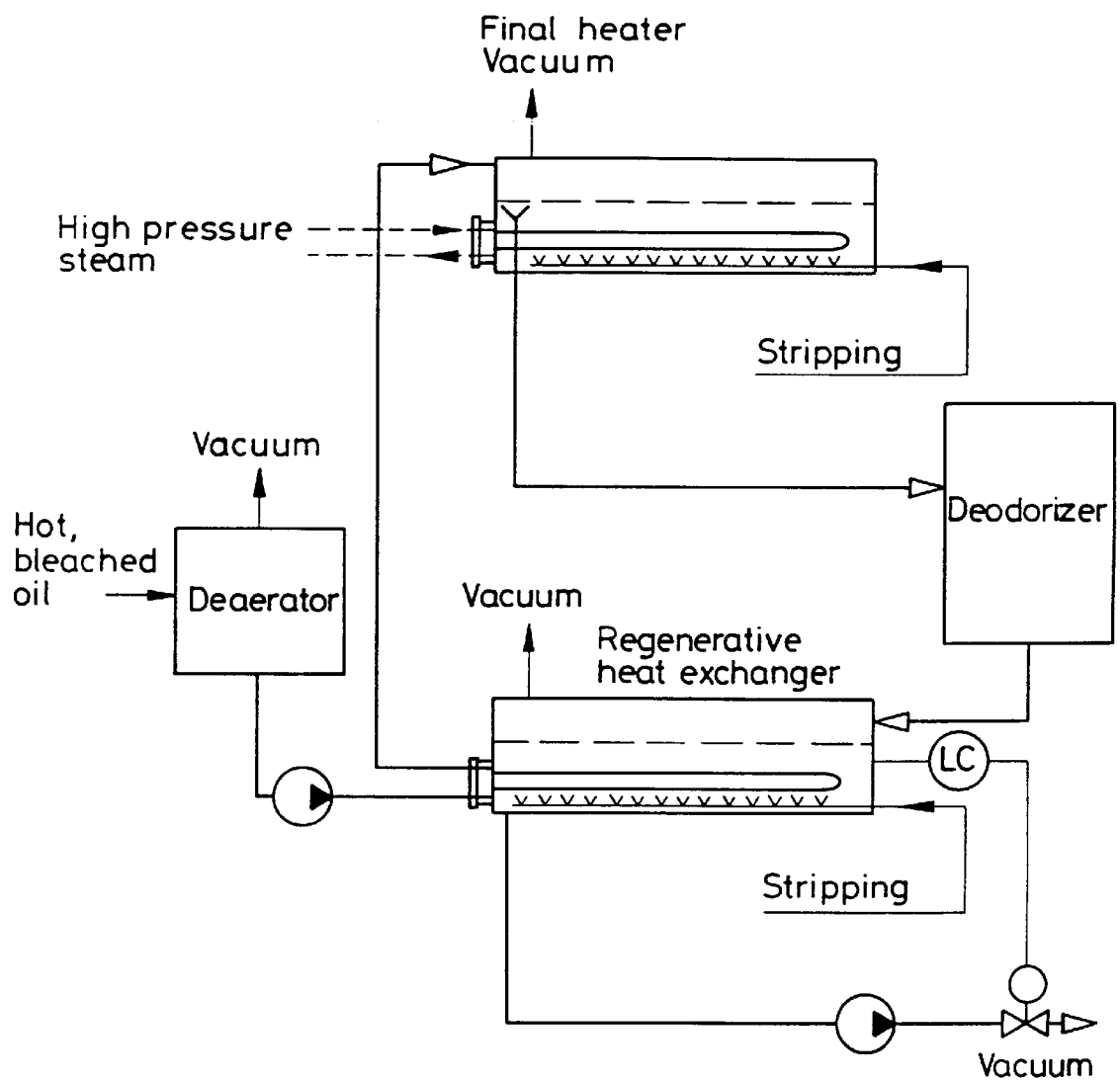
FIG. 5 a flow chart comprising vacuum vessels according to the invention.

In FIG. 5 there is shown how a vacuum vessel according to the invention may be part of a deodorization plant.

Hot bleached oil is deaerated under vacuum and pumped to a vacuum vessel according to the invention which works as a regenerative heat exchanger. Here the incoming oil which passes the heat exchanger within the U-tube meets hot deodorized oil during simultaneous addition of stripping gas to the treated oil. After this preheating the oil is led to a vacuum vessel according to the invention, a final heater, where the oil is heated by high pressure steam in U-tubes. The oil is heated during a simultaneous addition of stripping gas. When the deodorization temperature has been reached the oil is transported to the deodorizer which may be of a conventional kind. From this the oil is returned to the regenerative heat exchanger where treated oil as has been mentioned meets untreated oil.

Usually the vacuum vessels according to the invention are produced in some suitable stainless steel.

What is claimed is:

1. A vacuum vessel (1) for continuous or semi continuous treatment of fatty oil for deodorization thereof, said vessel comprising a substantially rectangular bottom (11), two long sides and two short sides, and having a plurality of partitions (2,2') parallel with one of the long sides of the vessel, each of said partitions having two ends and being sealingly connected at one of its ends to one or the other of the short sides of the vessel, with every second partition being sealingly connected to one short side and every other one of the partitions being sealingly connected to the other short side, said partitions thus forming a plurality of channels (3,3') connected in series through which the oil being treated is to pass, means for heating or cooling said oil comprising U-tubes (5,5') arranged in said channels (3,3') at which each channel contains at least one U-tube through which can pass a heating or cooling medium, perforated pipes 8 arranged at the bottom of the vessel for leading stripping gas into the oil, and a connection for a vacuum source, wherein the bottom (11) of a first channel in the vessel as seen in the flow direction of the oil is arranged on a higher level than a second channel as seen in the flow direction, such that the oil passes through the vessel by the force of gravity, further wherein the vessel has a smaller height dimension in comparison to a larger length dimension and further wherein all connections (6) for said U-tubes to a heating or cooling medium source are arranged at one short side of the vessel (7).

2. The vacuum vessel according to claim 1, wherein all connections (9) for the perforated pipes (8) for stripping gas are arranged at the other short side (12) of the vessel and said perforated pipes (8) are arranged below said means for heating or cooling oil in the channel.

3. The vacuum vessel according to claim 2, wherein the pipes (8) for stripping gas are arranged such that they can be unfastened for cleaning both the pipes for stripping gas and the outside of the U-tubes.

4. The vacuum vessel according to claim 1, wherein upper edges of the partitions (2) extend substantially above the surface of the oil.

5. The vacuum vessel according to claim 4, wherein the partitions (2) are welded to the bottom of the vessel.

6. The vacuum vessel according to claim 5, wherein at least one partition (2) is connected to an upper delimitation of the vessel at which openings for passage of stripping gas are arranged in the at least one partition.

7. The vacuum vessel according to claim 6, wherein the at least one partition is undulated.

8. The vacuum vessel according to claim 1, wherein the medium which is arranged to flow through the at least one U-tube comprises oil which later is to he heated to deodorizing temperature.

9. A vacuum vessel (1) for continuous or semicontinuous treatment of fatty oil for deodorization thereof, said vessel comprising a substantially rectangular bottom (11), two long sides and two short sides, and having a plurality of partitions (2,2') parallel with one of the long sides of the vessel, each of said partitions having two ends and being sealingly connected at one of its ends to one or the other of the short sides of the vessel, with every second partition being sealingly connected to one short side and every other one of the partitions being sealingly connected to the other short side, said partitions thus forming a plurality of channels (3,3') connected in series through which the oil being treated is to pass, means for heating or cooling said oil, perforated pipes arranged at the bottom of the vessel for leading stripping gas into the oil, and a connection for a vacuum source, wherein the bottom (11) of a first channel in the vessel as seen in the flow direction of the oil is arranged on a higher level than a second channel as seen in the flow direction, such that the oil passes through the vessel by the force gravity, further wherein the vessel has a smaller height dimension in comparison to a larger length dimension and further wherein the bottom of the vessel is curvedly attached to a vertical wall at each of the long sides of the vessel (7).

10. The vacuum vessel according to claim 9, wherein the means for heating or cooling the oil comprises U-tubes (5,5') arranged in said channels (3,3') at which each channel contains at least one U-tube through which can pass a heating or cooling medium.

* * * * *